Feb. 11, 1936.   R. TEMPLE, JR   2,030,803
COMPRESSING DEVICE
Filed Aug. 18, 1931   2 Sheets-Sheet 1
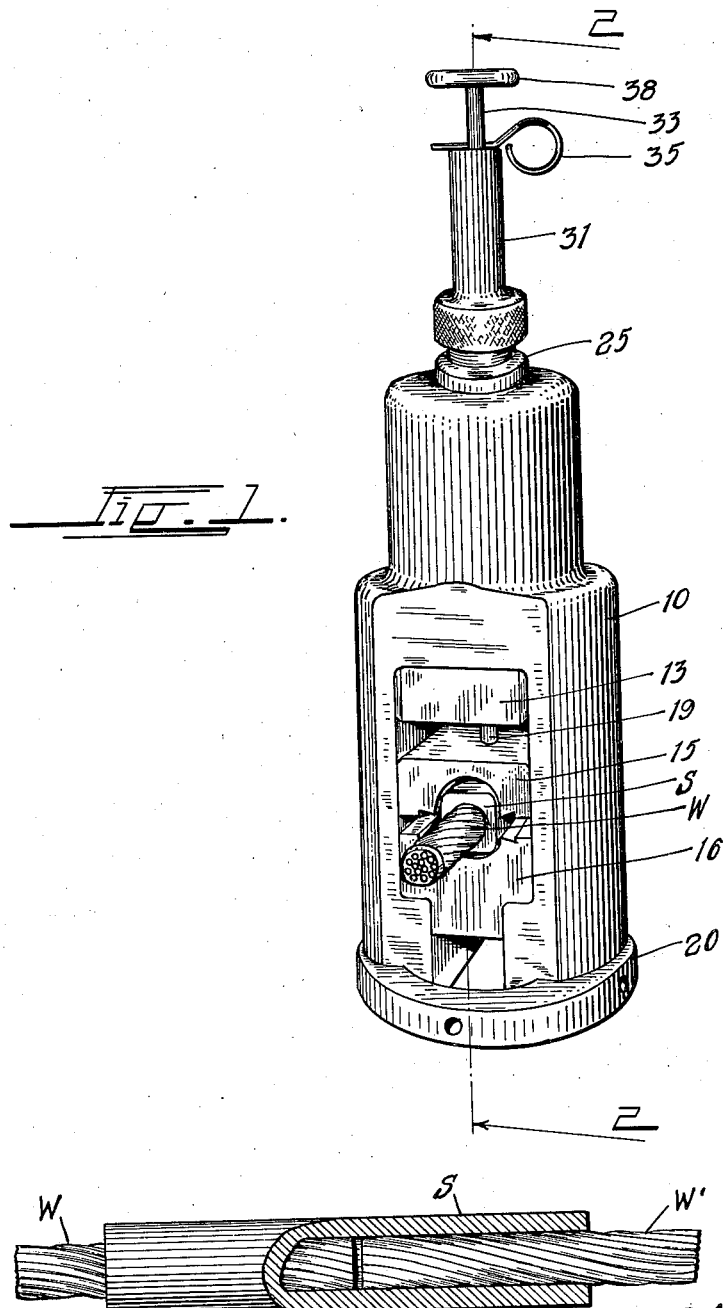

Feb. 11, 1936. R. TEMPLE, JR 2,030,803
COMPRESSING DEVICE
Filed Aug. 18, 1931   2 Sheets-Sheet 2
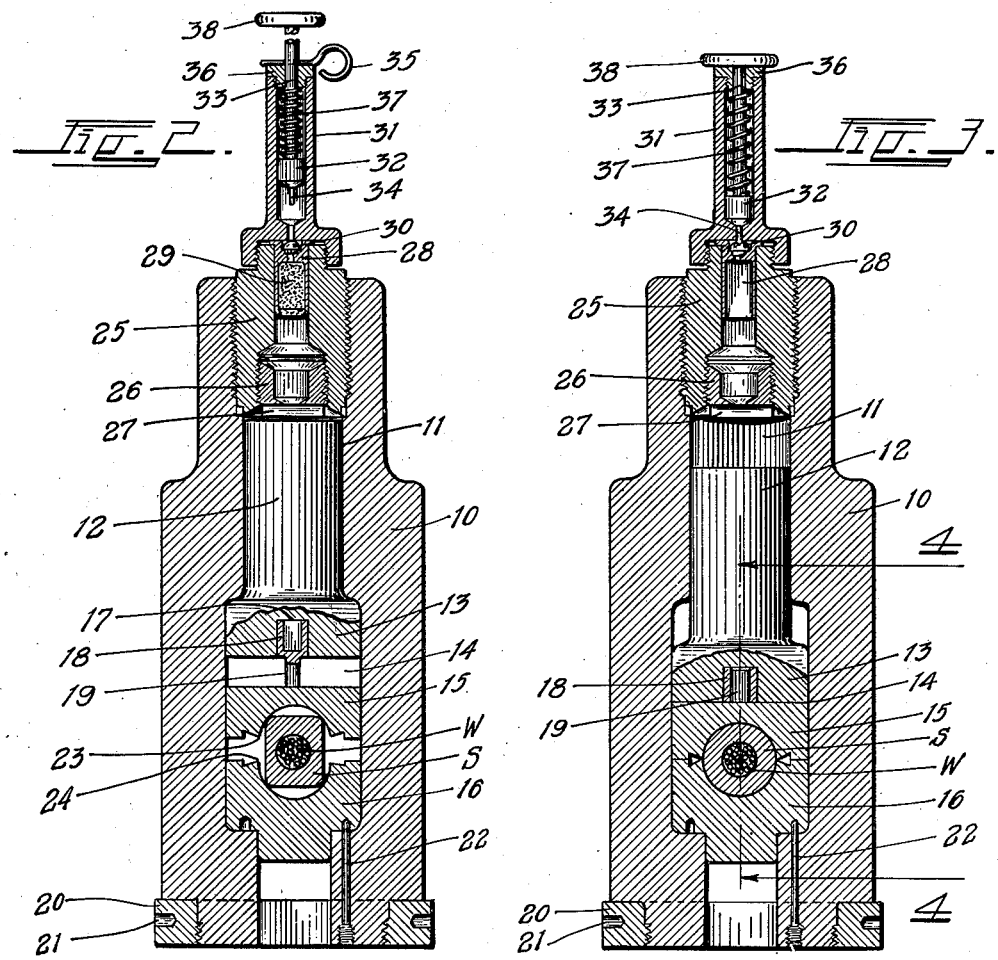
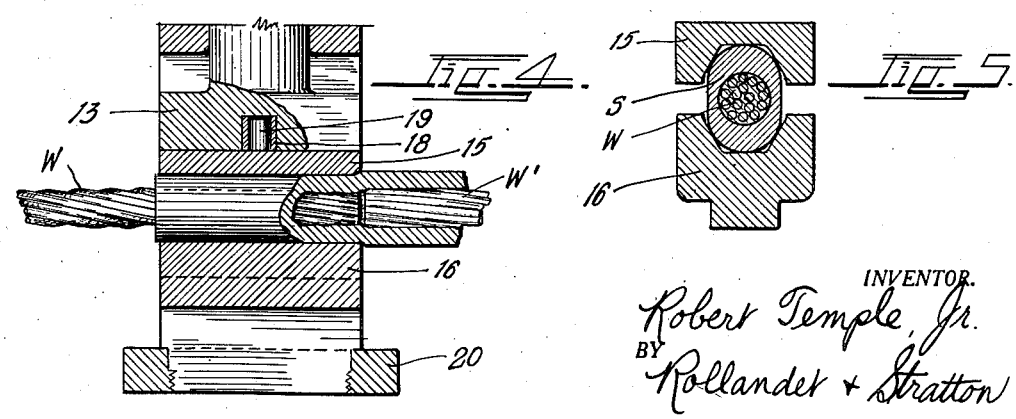
INVENTOR.
Robert Temple, Jr.
BY Rollander & Stratton
ATTORNEYS.

Patented Feb. 11, 1936

2,030,803

UNITED STATES PATENT OFFICE 2,030,803

COMPRESSING DEVICE

Robert Temple, Jr., Denver, Colo., assignor to Robert Temple, Inc., Denver, Colo.

Application August 18, 1931, Serial No. 557,857

21 Claims. (Cl. 140—113)

This invention relates to presses and more particularly to a structure in which the power for applying pressure is obtained by the expansive action of an explosive charge.

The preferred embodiment discloses a press of a type well adapted for compressing metal joint sleeves on the ends of metal cables and wires, solid or stranded, of electrical transmision circuits or lines. This type of explosively actuated press may also be used for die forging or bending operations, and for driving cotters, keys and wedges.

In the practical installation of electrical current transmission lines and connections of aluminum, copper, steel, alloys or other suitable metals, used in long transmission lines for electrical power, telephone or telegraph circuits or industrial plants, it becomes necessary to make joints between sections of cable or wires and also to connect branch lines with the main transmission line.

Such joints must have sufficient mechanical strength to sustain the stresses on the line, as well as to provide an intimate joint between the sections of the cable or wire and insure the highest possible efficiency in the transmission of the electrical current.

The latest approved practice makes use of such metal sleeves having holes axially throughout their length of a diameter large enough to admit the ends of the cable sections which are to be jointed. One end of the section of cable or wire is inserted in one end of the sleeve, then the assembly is placed in the press and power is applied to firmly compress the sleeve end around the end of the cable or wire.

The next operation is to insert an end of the cable or wire section, to be joined in the hole at the other end of the sleeve, which is then compressed.

In the case of attaching or fastening a branch line to the main transmission line, one end of the branch cable, or wire, is inserted in a socket opening of a suitably formed metal branch fitting and the fitting and end of branch cable, or wire, are then placed in the press and the metal branch fitting is compressed around the end of the branch cable, or wire.

It is important in making joints between stranded cables that the sleeve be compressed or squeezed onto the ends of the cable or wire so that the strands become one solid mass without any voids between the strands and also that the joint between the sleeve and stranded wire be electrically perfect.

Among the objects of the present invention then, is the provision of a press in which power is obtained through the use of an explosive charge. Another object contemplates a press which is portable and as light in weight as possible, consistent with safety in strength thereby to save time in such pressing operations.

It is of paramount importance that the full impact resulting from the ignition of the explosive charge be utilized in the operation of the press, and it is a further object of the invention to provide means to restrict the operation of the press until the maximum pressure is realized from the explosion of the charge.

Another object is to provide in a press of the above stated character, an explosion chamber circumferentially closed and an abutment at the end of the chamber in the line of operative movement so that said movement will be effected by the full force of the expansion of the gases resulting from the explosion of the charge.

To the attainment of the above and other objects which will appear as the description proceeds reference may be made to the accompanying drawings, in which Fig. 1 represents a perspective of the assembled press;

Fig. 2 is a longitudinal section of the press before compression, taken on line 2—2 of Fig. 1;

Fig. 3 is a similar longitudinal section of the press after compression;

Fig. 4 is a section on line 4—4 of Fig. 3 illustrating a sleeve having one end compressed about a cable;

Fig. 5 is a transverse section of hexagonal die members of the press before compression showing their relation to the work; and Fig. 6 is a view partly in section showing the manner of assembling a pair of cable ends in a sleeve.

This press may be said to comprise generally a body or main frame having mounted therein a pair of die members, and a piston-hammer for producing relative movement between the die members and a firing mechanism for detonating a charge which in turn actuates the piston.

Referring more specifically to the drawings in which like reference numerals designate like parts, it will be observed that the body or main frame 10 of the press comprises a cylindrical bore 11, one end of which forms an explosion chamber 27. Accurately fitted in the cylindrical bore 11 is a piston 12 having a rectangular hammer end 13. The cylindrical bore 11 is enlarged over a portion 14 of its length into a rectangular section, and the rectangular hammer 13 is accurately fitted to this enlarged rectangular portion 14. The body of the press adjacent the enlarged rectangular portion 14 takes the general form of a pair of legs, the enlarged rectangular portion 14 of the bore extending from one side to the other of the frame.

Mounted in the enlarged portion 14 adjacent the hammer is a die member 15 hereinafter designated as the upper die, which may be shaped as a half cylinder, hexagon, octagon or other suitable form. Also mounted in the portion 14 for cooperation with the die 15 is another die 16, which may be called the lower die.

The hammer 13 is formed with a recess 17 in which is fitted a compression stud having a hollow body 18 and a stud portion 19, this stud acting to support piston 12 at the top of cylindrical bore 11, thus maintaining predetermined volume of explosion chamber 27, and to retain the hammer 13 against compressing movement until maximum pressure is realized from the explosion of the charge.

This is an important feature of the press since by restricting the operative movement of the hammer-die until the pressure produced in the explosion chamber, is at its maximum, the blow of the hammer die upon the work supported on the anvil die, is delivered with all the force obtained by the expansion of the gases resulting from the ignition of the explosive charge.

The compression stud has a shearing action, its pressure-withstanding strength being slightly below the maximum pressure obtained in the explosion chamber, and it is to be understood that while its connection with the hammer die, as shown and described, is preferable by reason of simplicity in construction, the shearing-member may be placed at other points of the press and may be made in any suitable form within the scope of the invention.

Screwed to the lower end of the main frame 10 is a circular threaded ring 20, to tie the two legs at the lower end of the main frame, this ring being provided with openings 21 for the accommodation of a spanner wrench. A dowel pin 22 may be inserted adjacent the ring 20, to secure the lower die 16 in proper position. If desired, the dies 15 and 16 may be formed with cutting edges 23 and 24 to prevent the formation of fins on the sleeve after compression thereof.

At the upper end of the main frame 10 is a plug 25 which is screw threaded into the upper end of bore 11, and sealed in any convenient manner, this plug being effective to form a head for the explosion chamber above the piston 12. The plug 25 is hollow and provided, adjacent the explosion chamber or upper end of bore 11, with an adjusting screw 26 having a slot 27 for the reception of a suitable wrench. The purpose of the adjusting screw is to force the piston and hammer, together with the compression stud, and upper die, into engagement with the sleeve previous to the application of power, thus preventing any lost motion between the upper die, sleeve and lower die, and also to hold the sleeve in correct alignment prior to compression. The upper portion of the plug above the adjusting screw provides a chamber for the reception of a cartridge 28 containing a charge of powder 29, the cartridge being provided with a detonating cap 30. Fitted to the upper end of the plug 25 is the firing mechanism for detonating the charge, this mechanism taking the form of a tube or cylinder 31 which encloses a piston 32 having a stem 33 and a firing pin 34. The piston rod or stem 33 is transversely drilled to receive a releasing pin 35, designed to hold the piston and firing pin in an inoperative position. Surrounding the rod 33, between the closure 36 for the tube 31 and the piston 32 is a compression spring 37. 38 is a handle by means of which the piston 32 may be manipulated.

It is to be observed that in the operation of the press, the explosion chamber is circumferentially closed so that the full pressure of the explosion reacts upon a single abutment, which it is noted is directly in line with the movement of the hammer-die.

From the above description, the operation of the press will be readily apparent. The end of one cable or wire section W is inserted in the sleeve S, which is placed between the upper and lower dies. The compression stud 18—19 is inserted in the recess 17 of the hammer 13.

A suitable wrench is then inserted through the bore of the plug 25 and the adjusting screw 26 actuated to force the piston and hammer together with the compression stud and upper die down against the sleeve S which is then held properly in position by the dies with no lost motion between the dies and the sleeve. When the work is smaller, the adjusting screw 26 is screwed farther down, which thereby provides manual means for changing the size or volume of the explosion chamber above the piston 12, to compensate for different amounts of explosive charges and also to produce the required intensity of impact through the piston and hammer for the duty involved.

The cartridge with its powder charge and detonating cap is next inserted to close the bore of the plug 25. The firing mechanism, together with the piston which has been previously raised to compress the spring 37 and held in such position by the pin 35, is attached to the plug 25 above the cartridge.

The press is then ready for operation. When the releasing pin 35 is removed the spring 37, suddenly expanding will drive the piston and firing pin 34 against the detonating cap to explode the powder charge. Expanding gases therefrom will pass into the upper portion of bore 11, and the pressure generated thereby will drive the piston and hammer downward with intense energy shearing the stud 19 from its hollow body 18 and telescoping the stud and said body, in the position indicated in Fig. 3. Then the hammer 13 under high velocity will strike a powerful blow against the upper die, compressing the sleeve firmly around the cable or wire.

It will be noted that the piston 12 has a tight fit in the bore 11, so that the expanding or spent gases are not allowed to exhaust into the atmosphere, which prevents noise normally incident to an explosion. Immediately after the explosion, the spent gases condense, so that when the plug 25 is removed a small amount of moisture, which is the condensation of the gases, is present in the explosion chamber.

The same procedure is followed in compressing the sleeve around the other end or section of cable W'. Before the second blow is delivered a new compression stud is inserted in the recess 17 and also a new cartridge is inserted in the plug 25.

If the joined cable sections are too long to be readily withdrawn through the press, the die 16 and ring 20 may be removed to facilitate withdrawal of the finished joint from the press.

It is obvious that the upper and lower dies may be of such design and form as will produce desired results in the compression of sleeves for cable or wire joints, also die forgings or bending operations or various forms and shapes and the driving of cotters, dowel pins, keys and wedges.

As is known, the force of the exploding or expanding gases, is equal and opposite. By confining this reaction wholly within the present device, and by preventing the exhaust of gases into the atmosphere, recoil is prevented. The force of the explosion in an upward direction is taken care of by the top of the explosion chamber. The force in a downward direction is absorbed by the relatively stationary die 16, so that the force is not exerted beyond the device, which, as stated, prevents recoil.

Having thus described my invention, what I claim as new, and desire to secure by Letters Patent of the United States, is:—

1. A press comprising a frame having complemental die elements shaped to receive a piece of work therebetween, one of said elements being movable relative to the other element, means in said frame to receive an explosive charge, means to detonate said charge, and means, comprising a piston normally separated from the movable die-element and adapted to engage the same, to transmit the pressure of expansive force resulting from the detonation of the charge to the movable die element.

2. A press comprising a frame having complemental die elements shaped to receive a piece of work therebetween, one of said elements being movable relative to the other element, means in said frame to receive an explosive charge, means to detonate said charge, means to transmit the pressure of expansive force resulting from the detonation of the charge to the movable die element, and means interposed between said transmitting means and said movable die to retain transmitting means against compressing movement until maximum pressure is realized from the explosion of the charge.

3. A press comprising a body having an internal bore, a pair of legs extending from said body, removable means to clampingly secure said legs together, complementary die elements in said body shaped to receive a piece of work therebetween, one of said elements being movable relative to the other element, the other of said elements being demountably fixed between said legs, means in said body to receive an explosive charge, means to detonate said charge, and means slidably mounted in said bore to transmit the pressure of expansive force resulting from the detonation of the charge to the movable die element.

4. A press comprising a frame having complemental die elements shaped to receive a piece of work therebetween, one of said elements being movable relative to the other element, means in said frame to receive an explosive charge, means to detonate said charge, and means to transmit the pressure of expansive force resulting from the detonation of the charge to the movable die element, and manually actuatable means to move said transmitting member relative to said movable die member.

5. An explosively actuated press comprising a work support, a compression member, explosive means effective to produce a high pressure within the press, means to transmit said pressure to said compression member, and means cooperative with the compression member to restrict operation of said transmission means until a predetermined degree of pressure is attained in the operation of said explosive means.

6. A press comprising a frame having complemental die elements shaped to receive a piece of work therebetween, one of said elements being movable relative to the other element, means in said frame to receive an explosive charge, means to detonate said charge, means to transmit the pressure of expansive force resulting from the detonation of the charge to the movable die element, and means interposed between said transmitting means and said movable die to retain the transmitting member from movement relative to the movable die until maximum pressure from the explosion is realized.

7. A press comprising a frame having complementary die elements shaped to receive a piece of work therebetween, one of said elements being movable relative to the other element, means on said frame to receive an explosive charge, means to detonate said charge, means to transmit the pressure of expansive force resulting from the detonation of the charge to the movable die element, and means interposed between said transmitting means and said movable die, comprising a hollow body and a stud connected in alinement with the hollow portion of the body, to retain the transmitting means against compressing movement until the pressure is sufficient to break the connection between the body and stud and cause same to telescope.

8. A press comprising a frame having complementary die elements shaped to receive a piece of work therebetween, one of said elements being movable relative to the other element, a chamber in said frame to contain an explosive charge, means to detonate said charge, means to change the size of the chamber, and means to transmit the pressure of expansive force resulting from the detonation of the charge to the movable die element.

9. A press comprising a frame having complementary die elements shaped to receive a piece of work therebetween, one of said elements being movable relative to the other element, a chamber in said frame to contain an explosive charge, means to detonate said charge, manually operable screw means to change the size of the chamber, and means to transmit the pressure of expansive force resulting from the detonation of the charge to the movable die element.

10. A press comprising a body having a piston chamber and an explosion chamber axially in alinement, a member constituting a part of the explosion chamber, and adjustable in the direction of the axis of the same, whereby to vary the volume of the explosion chamber, a piston movable in the piston chamber, and a seat for work, disposed to subject the work to pressure by movement of the piston.

11. A press comprising a body having a piston chamber and an explosion chamber axially in alinement, a member constituting a part of the explosion chamber, and adjustable in the direction of the axis of the same, whereby to vary the volume of the explosion chamber, a piston movable in the piston chamber, and a seat for work, disposed to subject the work to pressure by movement of the piston, said member being adapted to engage the piston whereby to manually move the same toward the work seat, by adjustment of the member.

12. A press comprising a frame having spaced legs providing a seat for a removable die member, and adapted to clampingly secure said die member upon the seat, clamping means for the legs, a movable die member, means in the frame to receive an explosive charge, means to detonate said charge, and movable means to transmit the pressure of expansive force, resulting from detonation of the charge, to the movable die member.

13. A press comprising a frame having spaced legs providing a seat for a removable die member, and adapted to clampingly secure said die member upon the seat, a movable die member, a ring in screw-threaded engagement with the legs to effect their clamping action upon the removable die member, means in the frame to receive an explosive charge, means to detonate said charge, and movable means to transmit the pressure of expansive force, resulting from detonation of the charge, to the movable die member.

14. A press comprising a frame having spaced legs providing a seat for a removable die member, and adapted to clampingly secure said die member upon the seat, clamping means for the legs, a movable die member, a dowel pin to further secure the removable die member upon its seat, means in the frame to receive an explosive charge, means to detonate said charge, and movable means to transmit the pressure of expansive force, resulting from detonation of the charge, to the movable die member.

15. In a press having an explosion chamber and a body movable by the expansive force of an explosive detonated in said chamber, of a detonating device comprising a firing-element, including a housing, a spring-controlled firing pin in the housing, and a withdrawable member connected with the firing pin and normally resting against the housing to hold the pin in an inoperative position.

16. An explosion-press, a frame having an explosion chamber, a transmission-device movable by pressure produced in the chamber, and a shearing-member in the path of said transmission-device adapted to restrict movement of said device until the said pressure has reached a predetermined maximum.

17. An explosively-actuated press comprising a stationary die member and a relatively movable die member adapted to engage the work at opposite sides thereof, a piston chamber, a piston hammer in said chamber normally separated from the movable die member at one end of the piston chamber, a normally closed explosion chamber communicating with the piston chamber at the opposite end thereof, whereby an explosion in said chamber will cause the piston hammer to move toward the movable die member and subject the same to a blow upon engagement therewith, to drive it against the work on the stationary die member under a concussive action.

18. In an impact press, the combination of a frame, a piston slidable therein, means for receiving a charge of combustible material for generating gas to act on said piston and move the same, and means for retarding the initial movement of said piston, said means including a replaceable shear member having a resistance to shearing proportional to a predetermined gas pressure.

19. In an impact press, the combination of a frame, a piston slidable therein, means for receiving a charge of combustible material for generating gas to act on said piston and move the same, a hammer on said piston, shearable means for retarding the movement of said hammer, and an anvil spaced from said hammer for cooperation therewith when the hammer is released by said means.

20. In an impact press, the combination of a frame having a cylinder, a piston slidable therein, means for receiving a charge of combustible material arranged to discharge gas into said cylinder when ignited, means for igniting said charge, and a shearable member for retarding movement of said piston, said member being arranged to be sheared by said piston at a predetermined gas pressure.

21. In an impact press, the combination of a frame having a cylinder, a piston slidable therein, means for receiving a replaceable cartridge of combustible material arranged to discharge gas into said cylinder when ignited and having a detonating cap, removable means in said frame for access to said cartridge, firing mechanism in said means including a firing pin for cooperation with the cap of said cartridge, and shearable means for retarding movement of said piston until the gas pressure in the cylinder reaches a predetermined limit.

ROBERT TEMPLE, Jr.